United States Patent
Newnes et al.

[11] Patent Number: 5,863,176
[45] Date of Patent: Jan. 26, 1999

[54] VACUUM STICK AND LATH PLACER

[75] Inventors: William R. Newnes; Grant Hiebert, both of Salmon Arm, Canada

[73] Assignee: CAE Newnes Ltd., Salmon Arm, Canada

[21] Appl. No.: 821,658

[22] Filed: Mar. 20, 1997

Related U.S. Application Data

[60] Provisional application No. 60/013,804 Mar. 21, 1996.
[51] Int. Cl.⁶ .................................................. B65G 57/18
[52] U.S. Cl. ................................. 414/789.5; 414/797.9
[58] Field of Search ................ 198/468.4; 414/789.5, 414/797.9

[56] References Cited

U.S. PATENT DOCUMENTS

| | | |
|---|---|---|
| 2,928,559 | 3/1960 | Mosely . |
| 3,169,646 | 2/1965 | Mason . |
| 3,352,434 | 11/1967 | Zuercher . |
| 3,643,621 | 2/1972 | Newnes . |
| 3,823,834 | 7/1974 | Rysti . |
| 3,968,886 | 7/1976 | Leon . |
| 4,144,976 | 3/1979 | Rysti . |
| 4,229,133 | 10/1980 | Johnson . |
| 4,264,253 | 4/1981 | Kennison ............................. 414/789.5 |
| 4,360,303 | 11/1982 | Rysti . |
| 4,610,360 | 9/1986 | Forslund ................................ 209/518 |
| 4,801,233 | 1/1989 | Ritola ................................... 414/789.5 |
| 4,810,152 | 3/1989 | Gillingham ........................ 414/789.5 |
| 4,878,803 | 11/1989 | Whiddon ............................. 414/789.5 |
| 5,244,341 | 9/1993 | Dion ................................... 414/789.5 |
| 5,636,965 | 6/1997 | Newnes et al. ..................... 414/789.5 |

*Primary Examiner*—Janice L. Krizek
*Attorney, Agent, or Firm*—Antony C. Edwards

[57] ABSTRACT

A vacuum assisted stick and lath placer has a magazine for holding a stack of elongate members for transverse placement onto an upper surface of a tiered lumber package of longitudinally aligned tiers of lumber. A selectively actuable shear positioned beneath the magazine is selectively horizontally actuable so as to push a bottom-most elongate member from beneath the stack of elongate members into a pickup position along a travel path of a selectively telescoping vacuum pickup. The selectively telescoping vacuum pickup is selectively extendable between a retracted position, a first extended position corresponding to the pickup position, and a second extended position corresponding to the upper surface of the tiered lumber package.

4 Claims, 8 Drawing Sheets

VACUUM STICK AND LATH PLACER

This is a Provisional Application of Ser. No. 60/013,804 filed Mar. 21, 1996.

FIELD OF THE INVENTION

This invention relates to an apparatus for placing spacing sticks and/or lath onto stacks of lumber adjacent to a stacker in a sawmill, and in particular relates to a combined apparatus capable of placing either spacing sticks or packaging lath on top of tiers of lumber, perpendicular to the lumber, as the lumber is placed by a sawmill stacker, beneath the apparatus, according to the need as is determined by the length of the lumber and the intended destination of the stack, that is, drying or shipping.

BACKGROUND OF THE INVENTION

So called "sticks" or "spacing sticks" are used in a sawmill to hold apart successive tiers of lumber in a stack of lumber so that the stack can be dried. Lath on the other hand are much thinner than sticks and are used to bind lumber stacks together by insertion laterally across tiers of longitudinally aligned lumber, between successive tiers.

Previously most spacing stick and lath placing machines (placers) were separate machines and usually designed differently, for one purpose or the other (spacing sticks or lath). One example of a stick placer used for spacing lumber for drying purposes is U.S. Pat. No. 3,643,621 issued to Newnes. The device utilizes a plurality of single magazines with a placing device below each magazine. The device is well suited for the purpose it was intended, that of delivering spacing sticks of a certain width and thickness, but does not work effectively with thin lath used for finished lumber packages (to be transported or shipped) and could not easily be combined to accomplish both tasks.

An example of a lath placer is U.S. Pat. No. 5,244,341, issued to Dion, which utilizes a rotary vacuum actuator that picks the lath up off of a short curved stack and then rotates back and drops the lath a short distance onto the package. This device is useful for delivering thin packaging lath, but cannot effectively deliver spacing sticks used for spacing lumber for drying and could not be used in a combined system for delivering both lath and spacing sticks.

U.S. Pat. No. 3,968,886, issued to Leon, can only place either spacing sticks, or, possibly, lath at any one time, due to the width of each unit and, because of the constraint of the restricted area above the lumber stack, could not be combined to successfully place both spacing sticks or lath through the same apparatus.

Applicant is also aware of U.S. Pat. No. 3,169,646, which issued to Mason. The Mason device is designed for spacing sticks and, again, could only capably handle either spacing sticks, or possibly lath, at any one time. No means are provided for positive placement of spacing sticks or lath. As the surface of a lumber stack is rarely completely level, given that each piece of lumber is usually not exactly the same shape as the adjacent piece, spacing sticks are dropped from the Mason device, thereby increasing the likelihood of the stick being bounced and misplaced. It is also not provided that spacing sticks be placed positively at the ends of the lumber stacks, where sawmills require a flush end face of the stack to reduce checking as the lumber stack is dried.

SUMMARY OF THE INVENTION

The apparatus provides a support frame positioned above where the lumber is stacked and next to a lumber stacker. The lumber stacker includes hoist knees (positioned below the apparatus) that are raised to start a new stack and then lowered as each additional tier is added to the lumber stack. The apparatus includes a plurality of appropriately spaced magazine units mounted on top of the support frame. Each magazine unit contains one or two magazines, depending on whether the apparatus is used for spacing sticks or lath, and depending on the position of the apparatus above the stack. Means are provided for positioning the spacing sticks or lath for placement. The means for positioning the spacing sticks or lath includes a shear that is situated below the spacing stick or lath magazines, each shear aligned horizontally in line with the spacing sticks or lath. Each shear is actuated by a linkage, which is in turn linked to, and actuated by, an air cylinder or other selective actuating means. The shear is positioned at the bottom of each magazine, and, when actuated, pushes the bottom spacing stick or lath out from under the pile of spacing sticks or lath in the magazine and positions the spacing stick or lath for placement.

Means are provided for positive placement of the spacing sticks or lath onto the top of the lumber being stacked, which include at least one, and preferably, two vacuum nozzles. These vacuum nozzles are attached to vertical hollow members which acts as guides for the vacuum nozzles as well as vacuum conduits supplying a vacuum to the nozzles. Above the vacuum nozzles is positioned a cylinder attachment bracket that connects the two vacuum nozzles. An air cylinder, or other means, selectively extends the vacuum nozzles. When actuated, the air cylinder stroke transports the spacing stick or lath being held by the vacuum nozzles down onto the lumber being stacked, and thus positively places the spacing stick or lath on top of the lumber stack. Once the stick or lath is placed, the vacuum is shut off, allowing atmospheric air to enter the hollow members and thus the vacuum nozzles, so as to leave the spacing sticks or lath in the desired placement position. The air cylinder is then retracted, returning the vacuum nozzles to their upper-most position, ready to begin the next cycle.

The magazine units are placed at specific points above the lumber stack and are capable of operating selectively so as to place only a desired amount of spacing sticks or lath depending on the length of lumber being stacked, and depending on whether there are spacing sticks or lath being placed at any given time.

As each tier of lumber is placed beneath the apparatus, the apparatus will place a group of spacing sticks in their appropriate position on the lumber stack with the end spacing sticks flush with the ends of the lumber stack. If there is a finished product being stacked the apparatus will place a group of lath onto every 6th tier or so, perpendicular to the lumber stack, as may be required to build a stable lumber stack for transportation.

In summary, the vacuum assisted stick and lath placer of the present invention includes a magazine for holding a stack of elongate members for transverse placement onto an upper surface of a tiered lumber package of longitudinally aligned lumber. A selectively horizontally actuable shear means is provided beneath the magazine, the shear means selectively horizontally actuable to push a bottom-most elongate member from beneath the stack of elongate members into a pickup position. The pickup position is in the travel path of a selectively telescoping vacuum pickup and release means. The selectively telescoping vacuum pickup and release means is selectively extendable between a retracted position, a first extended position corresponding to the pickup position, and a second extended position corresponding to the upper surface of the tiered lumber package.

The selectively telescoping vacuum pickup and release means includes means for selectively applying a vacuum to a pickup and release interface at a lower-most end of the selectively telescoping vacuum pickup and release means, whereby the bottom-most elongate member which has been pushed into the pickup position may be adhered to the pickup and release interface by application of the vacuum when the selectively telescoping vacuum pickup and release means is at the first extended position The bottom-most elongate member may then be released from the pickup and release interface by removal of the vacuum when the selectively telescoping vacuum pickup and release means is at the second extended position.

Advantageously, the vacuum assisted stick and lath placer of the present invention includes, a longitudinally spaced apart array of the above described magazines, corresponding selectively actuable shear means, corresponding selectively telescoping vacuum pickup and release means, including corresponding means for selectively applying a vacuum to corresponding pickup and release interfaces.

Further advantageously, the vacuum assisted stick and lath placer of the present invention includes, instead of a single magazine or a longitudinal array of single magazines, an adjacent, longitudinally opposed pair of magazines for holding longitudinally opposed stacks of elongate members, whereby, for example, spacing sticks could be stored in one of the pair of magazines and lath in the other of the pair of magazines, for transverse placement onto an upper surface of a tiered lumber package of longitudinally aligned lumber. Selectively actuable shear means beneath each of the magazines in the longitudinally opposed pair of magazines are selectively horizontally actuable so as to push a bottom-most elongate member from beneath the corresponding stack of elongate members into a pickup position along a travel path of a selectively telescoping vacuum pickup and release means. The selectively telescoping vacuum pickup and release means is, as described above for the single magazine embodiments, selectively extendable between a retracted position, a first extended position corresponding to the pickup position, and a second extended position corresponding to the upper surface of the tiered lumber package. The selectively telescoping vacuum pickup and release means includes means for selectively applying a vacuum to a pickup and release interface at a lower-most end of the selectively telescoping vacuum pickup and release means. Thus a bottom-most elongate member may be adhered to the pickup and release interface by application of the vacuum when the selectively telescoping vacuum pickup and release means is at the first extended position. The bottom-most elongate member may then be released from the pickup and release interface by removal of the vacuum when the selectively telescoping vacuum pickup and release means is at the second extended position. A longitudinally spaced apart array of these pairs of magazines may be provided.

It is therefore an object of the present invention to produce an apparatus wherein spacing sticks or lath may be placed more precisely and more efficiently than that of most present known stick placers of the general type.

It is another object of the invention to produce an apparatus wherein spacing sticks and packaging lath may be delivered using the same apparatus.

It is yet another object of the invention to produce an apparatus wherein the speed of delivery is faster than with most presently known apparatus, while still maintaining accuracy, and being equal to the speed capabilities of common lumber stackers.

It is still another object of the invention to allow for the construction of a device that can be retro-fitted to existing lumber stackers without extensive changes to the stacker.

The invention provides other advantages which will be made clear in the description of the preferred embodiments.

BRIEF DESCRIPTION OF THE DRAWINGS

The invention will be better understood by reference to the accompanying drawings, wherein.

DETAILED DESCRIPTION OF THE PREFERRED EMBODIMENT

Figure 1:
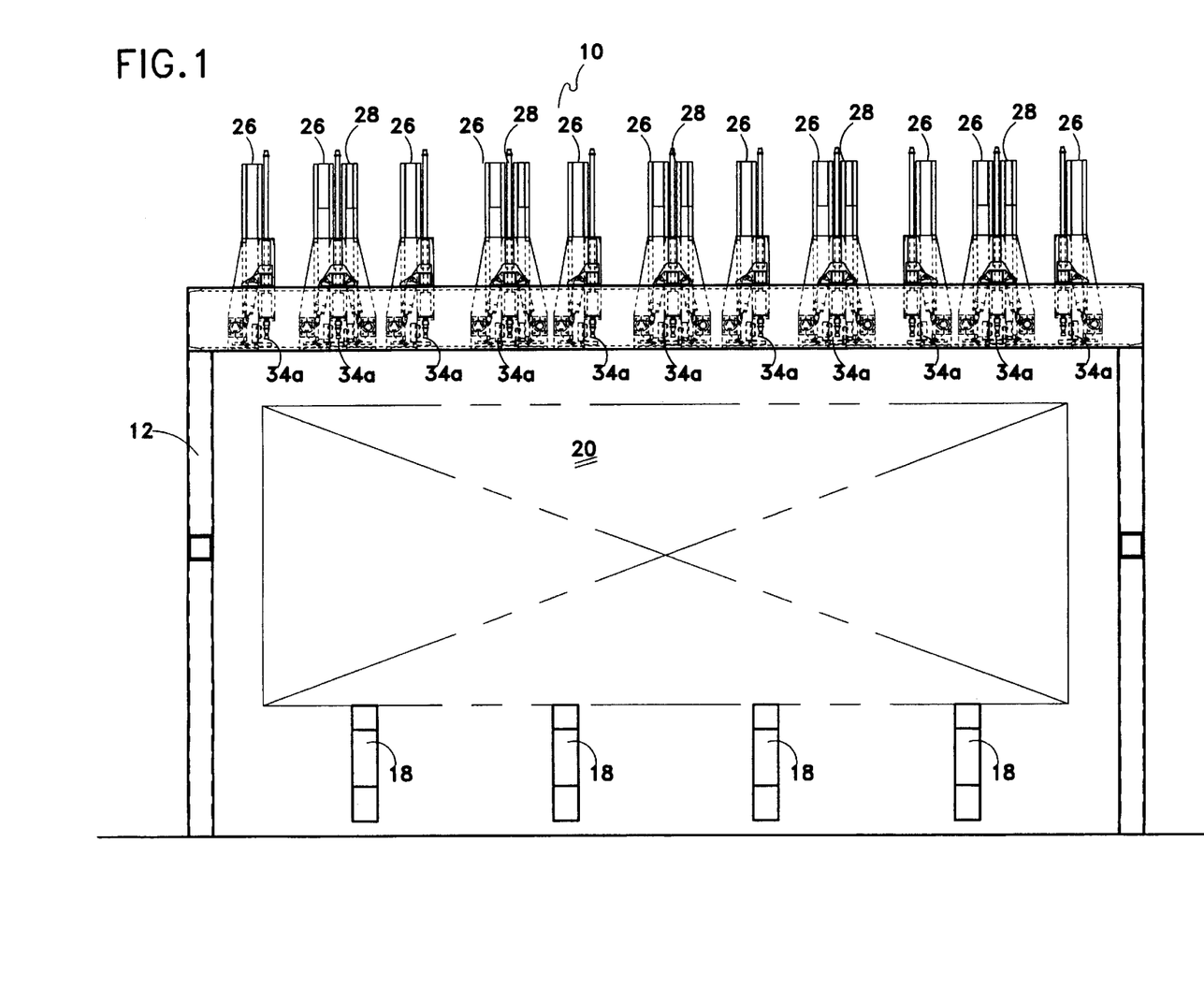
FIG. 1 is a right side elevation view according to a preferred embodiment of the invention.
Figure 2:
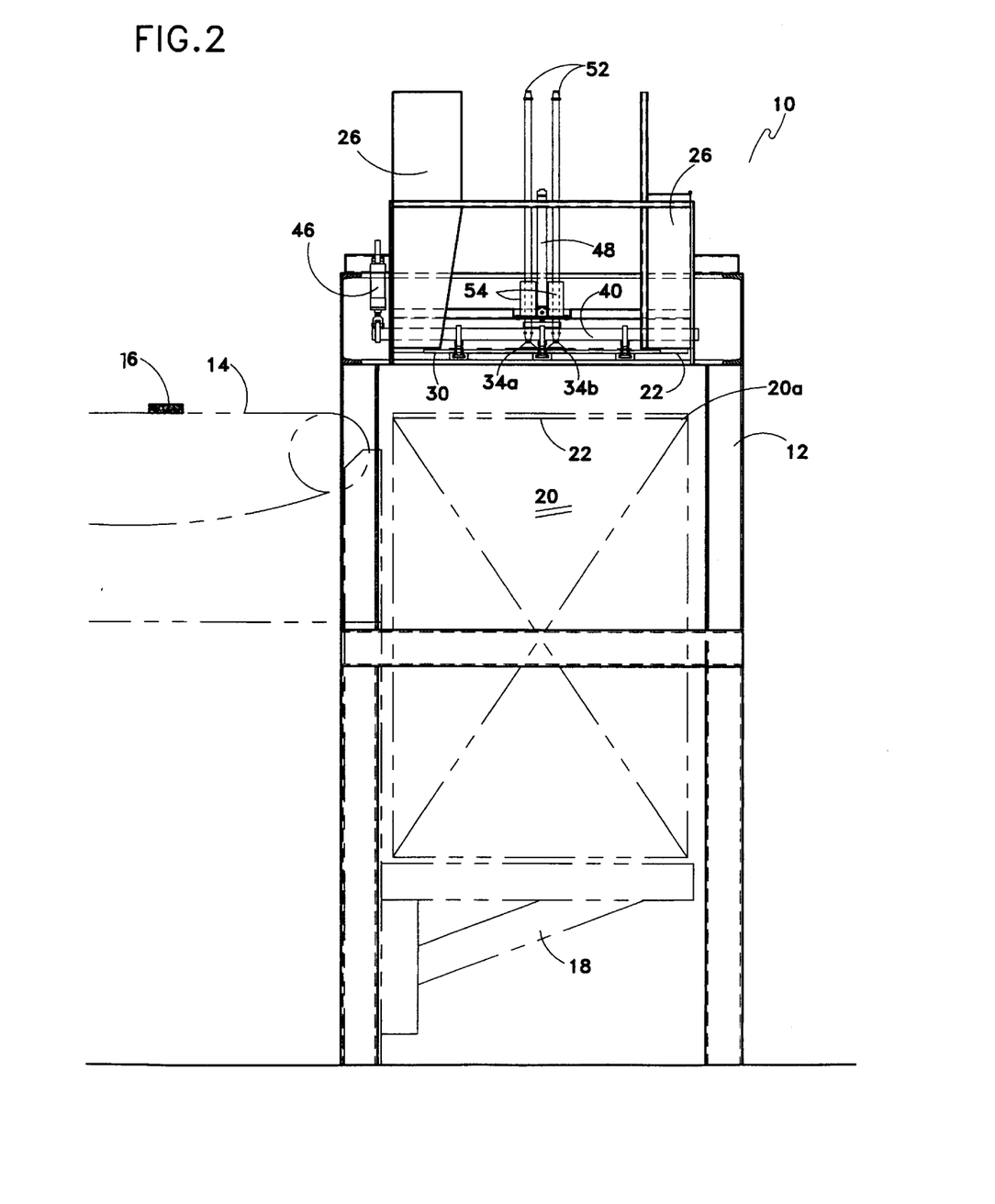
FIG. 2 is a front elevation view along line 2—2 in FIG. 3.
Figure 3:
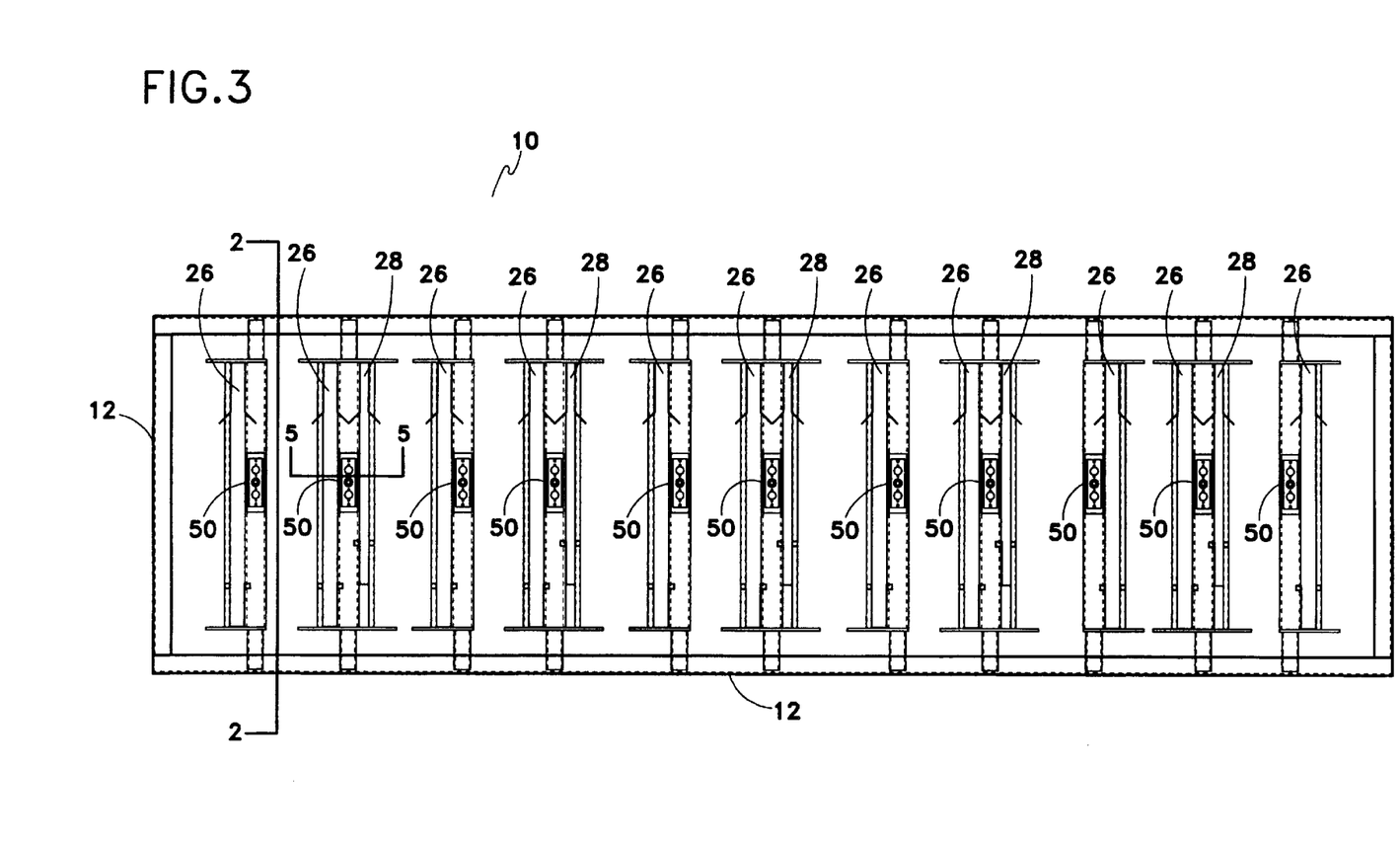
FIG. 3 is a plan view according to the preferred embodiment of the FIG. 1.
Figure 4:
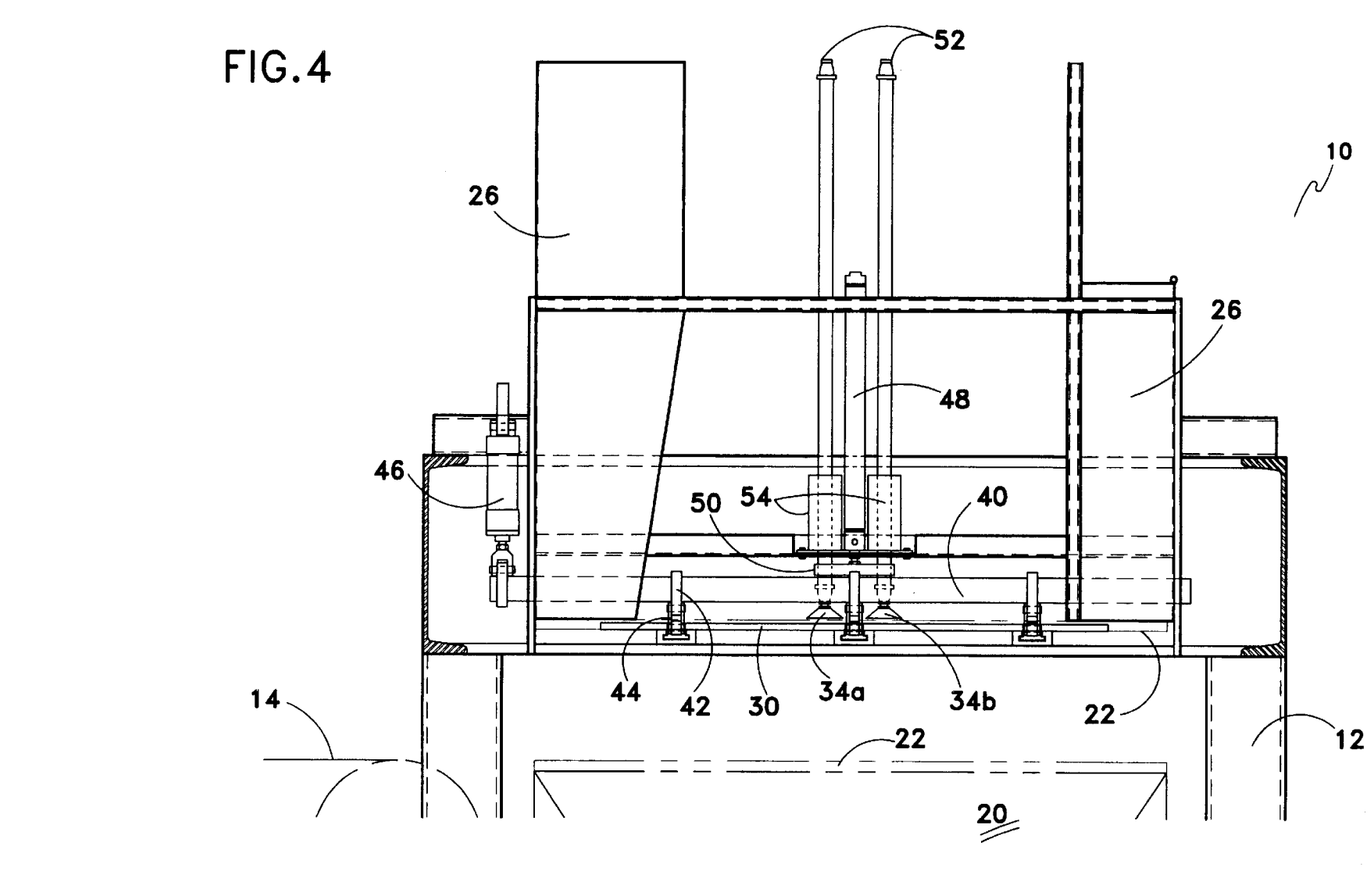
FIG. 4 is an enlarged, fragmentary front elevation view of a vacuum actuator of the present invention in its spacing stick clearing and upper most position.
Figure 5:
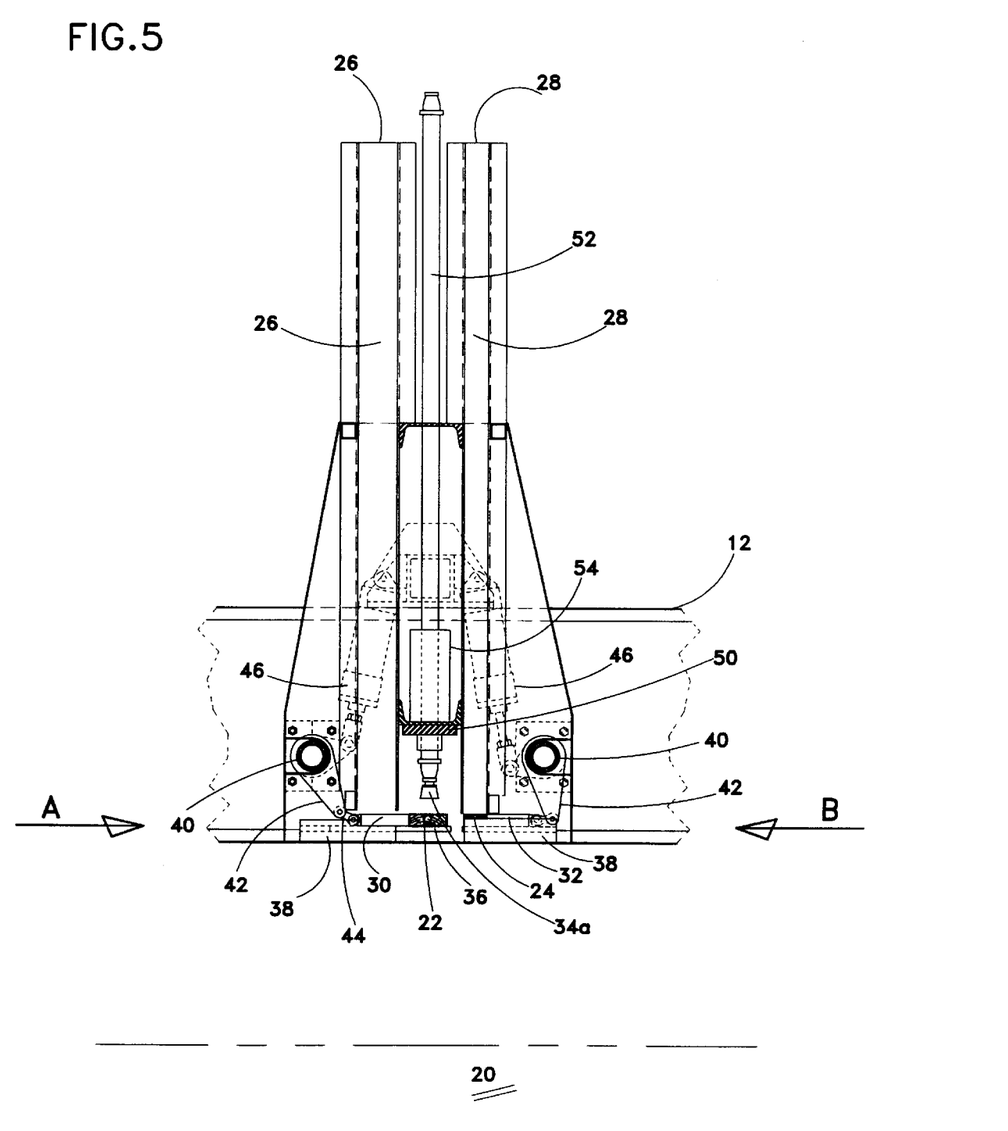
FIG. 5 is a side elevation view along line 5—5 in FIG. 3, with the vacuum actuator in its upper most position, showing a spacing stick in the spacing stick and lath picking position.
Figure 6:
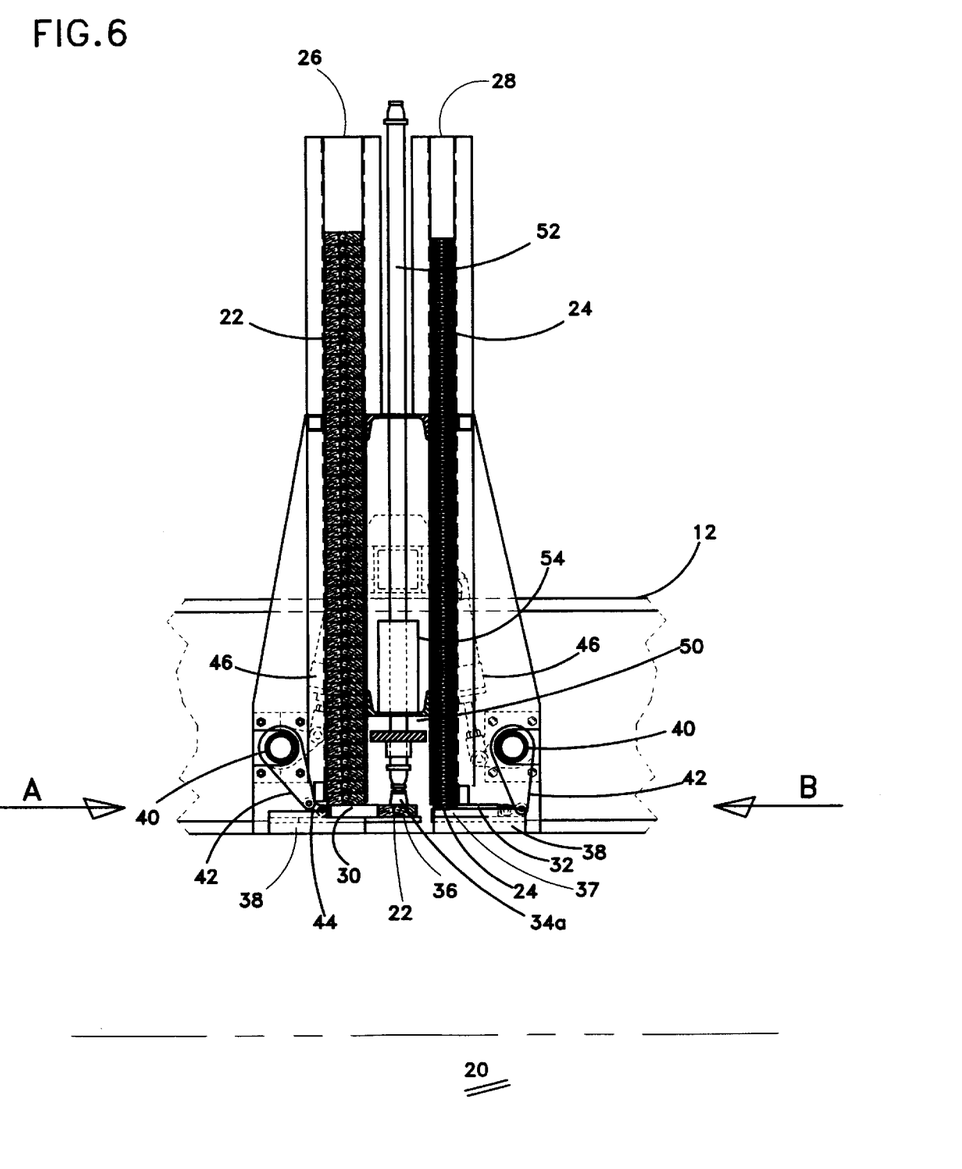
FIG. 6 is a side elevation view along line 5—5 in FIG. 3, with the vacuum actuator in its spacing stick and lath picking position, showing a spacing stick in the spacing stick and lath picking position.
Figure 7:
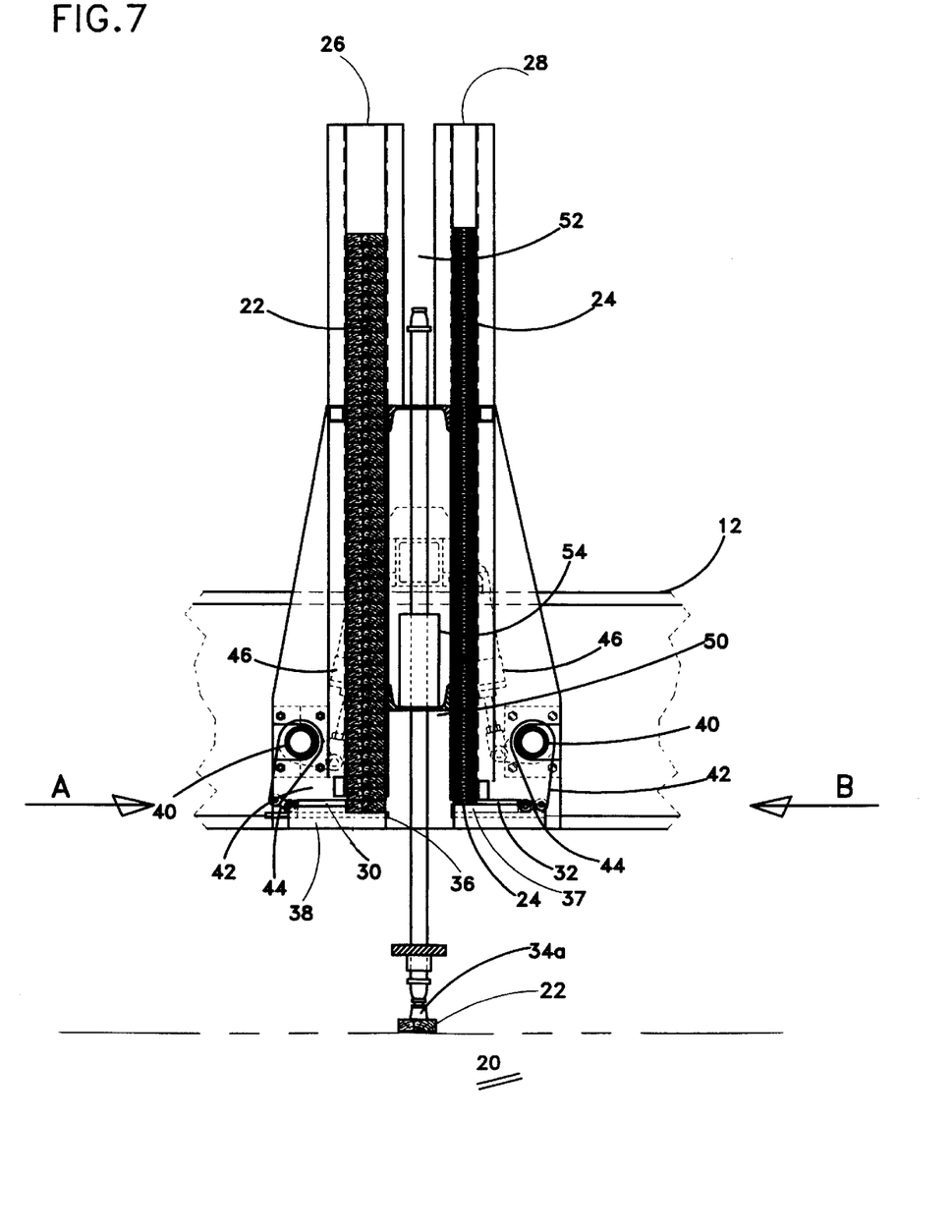
FIG. 7 is a side elevation view along line 5—5 in FIG. 3, with the vacuum actuator in its spacing stick and lath placing position, showing a spacing stick being placed onto the lumber stack.
Figure 8:
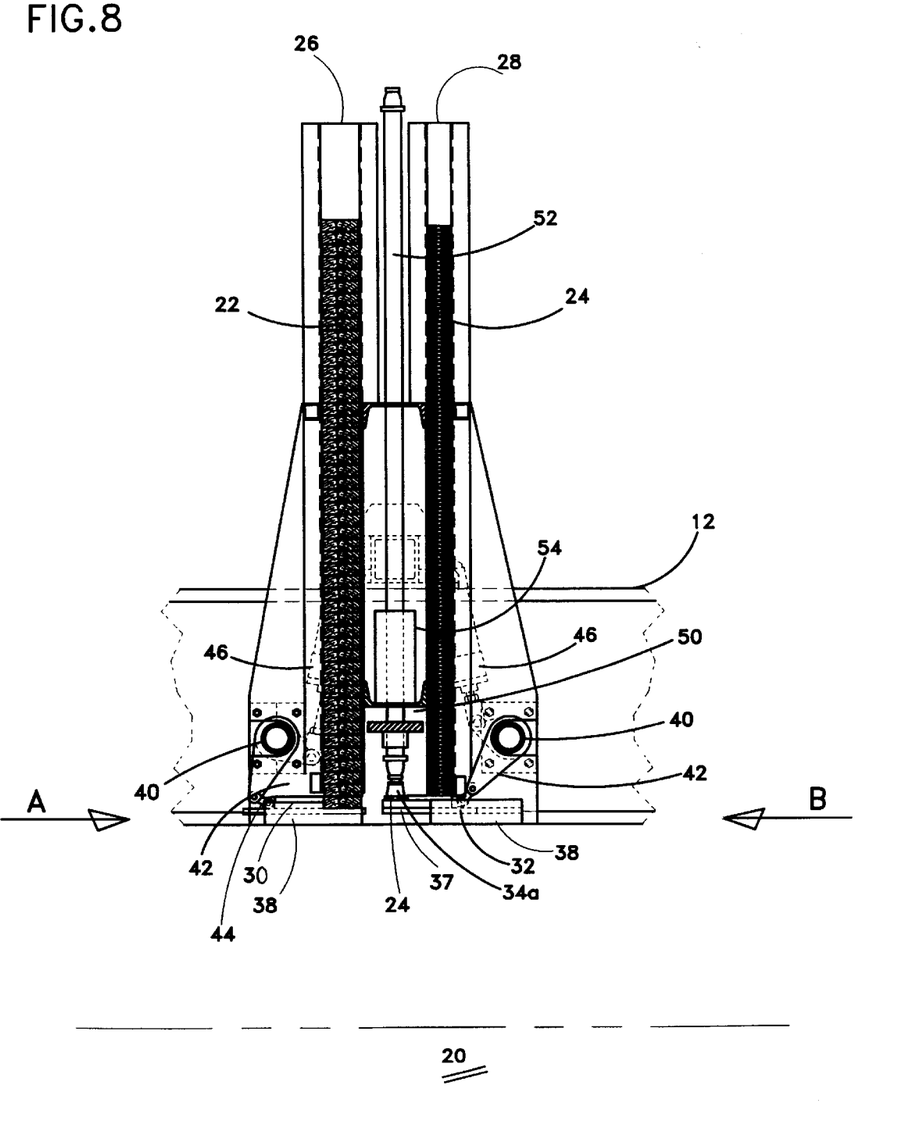
FIG. 8 is a side elevation view along line 5—5 in FIG. 3, with the vacuum actuator in its spacing stick and lath picking position, showing a lath in the spacing stick and lath picking position.

Referring to the drawing figures wherein similar characters of reference represent corresponding parts in each of several views, the apparatus is generally indicated by the reference numeral 10 and is best seen in FIGS. 1 and 2. The apparatus 10 includes a square tubular steel support frame constructed of various vertical and horizontal structural supports 12 and mounted next to a lumber stacker 14. The stacker 14 delivers lumber 16 in tiers or layers that are stacked onto hoist knees 18. Apparatus 10 places spacing sticks 22 or lath 24 between tiers of lumber.

The apparatus 10 includes spacing stick magazines 26 and lath magazines 28, for holding single stacks of spacing sticks 22 and lath 24. At the bottom of the magazines 26 and 28 are, respectively, spacing stick indexing shears 30 and lath indexing shears 32, which may be actuated to translate across the bottom of the magazines 26 and 28 so as to index a spacing stick or lath into the placement position beneath a pair of vacuum nozzles 34a and 34b. Indexing shear bottoms 36 and 37 correspond to index shears 30 and 32 and act as a carriage for shears 30 and 32. Shear bottoms 36 and 37 travelling in tracks 38, are mounted just below the bottom of magazines 26 and 28. Attached to the rear of the indexing shear bottoms 36 and 37 are linkage rods 40, attached via linkage arms 42 and linkage connectors 44.

An actuating cylinder 46 rotates linkage rod 40 which in turn actuates translation of indexing shears 30 and 32 in directions A and B respectively, which causes a spacing stick 22 or lath 24 to be pushed out from the bottom of magazine 26 or 28 into placement position. Vacuum nozzles 34a and 34b are translated down by actuation of an air cylinder 48 attached to a bracket 50. Hollow member 52, is attached to vacuum nozzles 34a and 34b and communicate a vacuum to vacuum nozzles 34a and 34b. Hollow member 52 is positioned by a guide bushing 54, whereby hollow member 52 is free to translate vertically up or down but not laterally side-to-side Once vacuum nozzles 34a and 34b have been lowered to touch spacing stick 22 or lath 24, a vacuum valve (not shown) that is opened to provide a vacuum to vacuum nozzles 34a and 34b whereby the spacing stick 22 or the lath 24 is held against vacuum nozzles 34a and 34b. Air cylinder 48 is actuated to move the vacuum nozzles up a small increment, thereby allowing indexing shears 30 and 32 and indexing shear bottoms 36, 37 to be retracted from under the stack of spacing sticks 22 or lath 24. Once retracted, the stack drops down to the corresponding indexing shear bottom 36, 37 ready for the next indexing cycle.

As the indexing shear bottoms 36, 37 and indexing shears 30 and 32 are retracted, air cylinder 48 is lowered, transporting spacing stick 22 or lath 24 to the top surface of the lumber stack 20. The vacuum valve (not shown) is again actuated to close off the vacuum supply and to allow ambient atmospheric air into vacuum nozzles 34a and 34b thereby releasing spacing sticks 22 or lath 24, leaving spacing sticks 22 or lath 24 on top of the lumber stack 20. Lumber stack 20 is then lowered an increment by stacker hoist knees 18 to position the lumber stack 20 for another tier of lumber and for a subsequent set of spacing sticks 22 or lath 24. The cycle then repeats to complete stacking of lumber stack 20.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A vacuum assisted stick and lath placer comprising:
   a magazine for holding a stack of elongate members for transverse placement onto an upper surface of a tiered lumber package of longitudinally aligned tiers of lumber,
   selectively actuable shear means beneath said magazine, selectively horizontally actuable so as to push a bottom-most elongate member from beneath said stack of elongate members into a pickup position along a travel path of a selectively telescoping vacuum pickup and release means,
   said selectively telescoping vacuum pickup and release means selectively extendable between a retracted position, a first extended position corresponding to said pickup position, and a second extended position corresponding to said upper surface of said tiered lumber package,
   said selectively telescoping vacuum pickup and release means including means for selectively applying a vacuum to a pickup and release interface at a lower-most end of said selectively telescoping vacuum pickup and release means, whereby said bottom-most elongate member may be adhered to said pickup and release interface by application of said vacuum when said selectively telescoping vacuum pickup and release means is at said first extended position, and whereby said bottom-most elongate member may be released from said pickup and release interface by removal of said vacuum when said selectively telescoping vacuum pickup and release means is at said second extended position.

2. A vacuum assisted stick and lath placer comprising:
   a longitudinally spaced apart array of magazines for holding a stack of elongate members for transverse placement onto an upper surface of a tiered lumber package of longitudinally aligned tiers of lumber,
   each of said magazines in said longitudinally spaced apart array of magazines having a corresponding selectively actuable shear means beneath said magazine, selectively horizontally actuable so as to push a bottom-most elongate member from beneath said stack of elongate members into a pickup position along a travel path of a corresponding selectively telescoping vacuum pickup and release means,
   said selectively telescoping vacuum pickup and release means selectively extendable between a retracted position, a first extended position corresponding to said pickup position, and a second extended position corresponding to said upper surface of said tiered lumber package,
   said selectively telescoping vacuum pickup and release means including means for selectively applying a vacuum to a pickup and release interface at a lower-most end of said selectively telescoping vacuum pickup and release means, whereby said bottom-most elongate member may be adhered to said pickup and release interface by application of said vacuum when said selectively telescoping vacuum pickup and release means is at said first extended position, and whereby said bottom-most elongate member may be released from said pickup and release interface by removal of said vacuum when said selectively telescoping vacuum pickup and release means is at said second extended position.

3. A vacuum assisted stick and lath placer comprising:
   a longitudinally opposed pair of adjacent magazines for holding longitudinally opposed stacks of elongate members for transverse placement onto an upper surface of a tiered lumber package of longitudinally aligned tiers of lumber,
   selectively actuable shear means beneath each of said magazines in said longitudinally opposed pair of magazines selectively horizontally actuable so as to push a bottom-most elongate member from beneath the corresponding stack of elongate members into a pickup position along a travel path of a selectively telescoping vacuum pickup and release means,
   said selectively telescoping vacuum pickup and release means selectively extendable between a retracted position, a first extended position corresponding to said pickup position, and a second extended position corresponding to said upper surface of said tiered lumber package,
   said selectively telescoping vacuum pickup and release means including means for selectively applying a vacuum to a pickup and release interface at a lower-most end of said selectively telescoping vacuum pickup and release means, whereby said bottom-most elongate member may be adhered to said pickup and release interface by application of said vacuum when said selectively telescoping vacuum pickup and release means is at said first extended position, and whereby said bottom-most elongate member may be released from said pickup and release interface by removal of said vacuum when said selectively telescoping vacuum pickup and release means is at said second extended position.

4. A vacuum assisted stick and lath placer comprising:

a longitudinally spaced apart array of longitudinally opposed pairs of adjacent magazines for holding longitudinally opposed stacks of elongate members for transverse placement onto an upper surface of a tiered lumber package of longitudinally aligned tiers of lumber, each of said pairs of magazines in said longitudinally spaced apart array of longitudinally opposed pairs of adjacent magazines having corresponding selectively actuable sheer means beneath each of said magazines in said pairs of magazines, selectively horizontally actuable so as to push a bottom-most elongate member from beneath a corresponding stack of elongate members into a pickup position along a travel path of a corresponding selectively telescoping vacuum pickup and release means, said selectively telescoping vacuum pickup and release means selectively extendable between a retracted position, a first extended position corresponding to said pickup position, and a second extended position corresponding to said upper surface of said tiered lumber package, said selectively telescoping vacuum pickup and release means including means for selectively applying a vacuum to a pickup and release interface at a lowermost end of said selectively telescoping vacuum pickup and release means, whereby said bottom-most elongate member may be adhered to said pickup and release interface by application of said vacuum when said selectively telescoping vacuum pickup and release means is at said first extended position, and whereby said bottom-most elongate member may be released from said pickup and release interface by removal of said vacuum when said selectively telescoping vacuum pickup and release means is at said second extended position.

* * * * *